US012155122B2

(12) United States Patent
Park et al.

(10) Patent No.: US 12,155,122 B2
(45) Date of Patent: Nov. 26, 2024

(54) DIVERSITY ANTENNA AND ELECTRONIC DEVICE INCLUDING THE SAME

(71) Applicant: ELECTRONICS AND TELECOMMUNICATIONS RESEARCH INSTITUTE, Daejeon (KR)

(72) Inventors: Juderk Park, Daejeon (KR); Jae Hong Ruy, Sejong-si (KR); Chang Won Lee, Osan-si (KR); Byeong Cheol Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 161 days.

(21) Appl. No.: 17/896,760

(22) Filed: Aug. 26, 2022

(65) Prior Publication Data

US 2023/0163480 A1 May 25, 2023

(30) Foreign Application Priority Data

Nov. 23, 2021 (KR) ........................ 10-2021-0162591
Apr. 20, 2022 (KR) ........................ 10-2022-0048952

(51) Int. Cl.
*H01Q 21/00* (2006.01)
*H01Q 1/12* (2006.01)
*H01Q 1/36* (2006.01)
*H01Q 21/08* (2006.01)

(52) U.S. Cl.
CPC ........... *H01Q 21/0006* (2013.01); *H01Q 1/12* (2013.01); *H01Q 1/36* (2013.01); *H01Q 21/08* (2013.01)

(58) Field of Classification Search
CPC .... H01Q 21/0006; H01Q 21/06; H01Q 21/08; H01Q 21/10; H01Q 1/12
See application file for complete search history.

(56) References Cited

U.S. PATENT DOCUMENTS

| | | | | |
|---|---|---|---|---|
| 5,898,405 A * | 4/1999 | Iwasaki | H01Q 1/38 | 343/846 |
| 6,057,804 A * | 5/2000 | Kaegebein | H01Q 9/32 | 343/792 |
| 6,593,892 B2 * | 7/2003 | Honda | H01Q 9/28 | 343/893 |

(Continued)

FOREIGN PATENT DOCUMENTS

| | | |
|---|---|---|
| EP | 1175021 A2 | 1/2002 |
| KR | 10-2005-0025903 A | 3/2005 |

(Continued)

*Primary Examiner* — Jason M Crawford
(74) *Attorney, Agent, or Firm* — LRK PATENT LAW FIRM

(57) ABSTRACT

Provided is a diversity antenna and an electronic device including the same. The diversity antenna according to various example embodiments includes a plurality of radiation elements having a tubular shape with apertured upper and lower portions, and a connection plate configured to connect the plurality of radiation elements to each other, the plurality of radiation elements is arranged in a vertical direction coaxially, and the connection plate includes an aperture configured to allow a power supply line to pass through.

12 Claims, 8 Drawing Sheets

(56) References Cited

U.S. PATENT DOCUMENTS

| | | | | |
|---|---|---|---|---|
| 6,720,934 | B1 * | 4/2004 | Price | H01Q 21/0006 343/792 |
| 8,203,500 | B2 * | 6/2012 | Honda | H01Q 9/22 343/895 |
| 8,698,696 | B1 * | 4/2014 | McCandless | H01Q 21/0037 343/810 |
| 9,356,340 | B2 * | 5/2016 | Nilsson | H01Q 1/42 |
| 9,419,332 | B2 * | 8/2016 | Nilsson | H01Q 9/28 |
| 9,941,599 | B2 * | 4/2018 | Eide | H01Q 21/30 |
| 10,403,969 | B2 | 9/2019 | Yoon et al. | |
| 11,133,601 | B2 | 9/2021 | Yoon et al. | |
| 2007/0040758 | A1 * | 2/2007 | Dwyer | H01Q 21/062 343/792 |
| 2007/0241984 | A1 * | 10/2007 | Schadler | H01Q 1/246 343/810 |
| 2009/0237314 | A1 * | 9/2009 | Lalezari | H01Q 21/10 343/773 |
| 2010/0188308 | A1 * | 7/2010 | Honda | H01Q 9/28 343/858 |
| 2012/0188137 | A1 * | 7/2012 | Lalezari | H01Q 21/10 343/773 |
| 2023/0106893 | A1 * | 4/2023 | Saveri | H01Q 9/22 343/702 |
| 2023/0163480 | A1 * | 5/2023 | Park | H01Q 21/28 343/893 |

FOREIGN PATENT DOCUMENTS

| | | | |
|---|---|---|---|
| KR | 10-2005-0027035 | A | 3/2005 |
| KR | 10-2007-0102369 | A | 10/2007 |
| KR | 10-0809016 | B1 | 3/2008 |

* cited by examiner

DIVERSITY ANTENNA AND ELECTRONIC DEVICE INCLUDING THE SAME

CROSS-REFERENCE TO RELATED APPLICATION

This application claims the benefit of Korean Patent Application No. 10-2021-0162591 filed on Nov. 23, 2021 and Korean Patent Application No. 10-2022-0048952 filed on Apr. 20, 2022, in the Korean Intellectual Property Office, the entire disclosures of which are incorporated herein by reference for all purposes.

BACKGROUND

1. Field of the Invention

The disclosure relates to a diversity antenna and an electronic device including the same.

2. Description of Related Art

A monopole antenna has a simple structure and an omni-directional radiation characteristic, and accordingly, the monopole antenna can be used in a small or mobile electronic device.

Antenna diversity means that a plurality of antennas (e.g., a plurality of monopole antennas) is used in one electronic device for enhancing transmitting and receiving performance of the electronic device. A diversity antenna refers to an antenna that is used for antenna diversity.

The above description has been possessed or acquired by the inventor(s) in the course of conceiving the present disclosure and is not necessarily an art publicly known before the present application is filed.

SUMMARY

When using a plurality of antennas for the antenna diversity, each of the plurality of antennas may not have an omni-directional radiation characteristic due to interference between the plurality of antennas.

In various example embodiments, the omni-directional radiation characteristic may be obtained by arranging the plurality of antennas coaxially and locating a power supply line inside a radiation element.

In various example embodiments, a reference point may be set accurately by arranging the plurality of antennas coaxially, and therefore, it is possible to increase accuracy when searching for a location of an object by using a radio frequency (RF).

However, the technical problems are not limited to the technical problems described above and other technical problems may exist.

According to an aspect, there is provided a diversity antenna including a plurality of radiation elements having a tubular shape with apertured upper and lower portions, and a connection plate configured to connect the plurality of radiation elements to each other, in which the plurality of radiation elements is arranged in a vertical direction coaxially, and the connection plate includes an aperture configured to allow a power supply line to pass through.

The tubular shape may include a cylindrical shape.

The diversity antenna may further include a printed circuit board (PCB) configured to connect the power supply line to the plurality of radiation elements.

The PCB may be disposed on an upper surface of the connection plate.

The diversity antenna may further include an earth plate for earthing of the diversity antenna, and the earth plate may be disposed on a lower surface of the connection plate.

The diversity antenna may further include a connector configured to connect the power supply line to the PCB, and the connector may be formed to penetrate the connection plate and the earth plate.

The diversity antenna may further include a lower plate coupled to a lower aperture of a first radiation element that is disposed at a lowermost end among the plurality of radiation elements; and an upper plate coupled to an upper aperture of a second radiation element that is disposed at an uppermost end among the plurality of radiation elements, and the lower plate may include an aperture configured to allow the power supply to pass through.

The diversity antenna may further include a second power supply line configured to connect, to the plurality of radiation elements, a first power supply line that is connected to an electronic device, and the second power supply line may be disposed inside the plurality of radiation elements.

The diversity antenna may further include a PCB configured to connect the second power supply line to the plurality of radiation elements.

The PCB may be disposed on an upper surface of the connection plate.

The diversity antenna may further include an earth plate for earthing of the diversity antenna, and the earth plate may be disposed on a lower surface of the connection plate.

The diversity antenna may further include a first connector configured to connect the second power supply line to the PCB, and the first connector may be formed to penetrate the connection plate and the earth plate.

The diversity antenna may further include a lower plate coupled to a lower aperture of a first radiation element that is disposed at a lowermost end among the plurality of radiation elements, an upper plate coupled to an upper aperture of a second radiation element that is disposed at an uppermost end among the plurality of radiation elements, and a second connector configured to connect the first power supply line to the second power supply line, and the second connector may be formed to penetrate the lower plate.

According to another aspect, there is provided an electronic device including: a housing, and a diversity antenna that is disposed outside the housing, in which the diversity antenna includes: a plurality of radiation elements having a tubular shape with apertured upper and lower portion, and a connection plate configured to connect the plurality of radiation elements to each other, the plurality of radiation elements is arranged in a vertical direction coaxially, and the connection plate includes an aperture configured to allow a power supply line to pass through.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
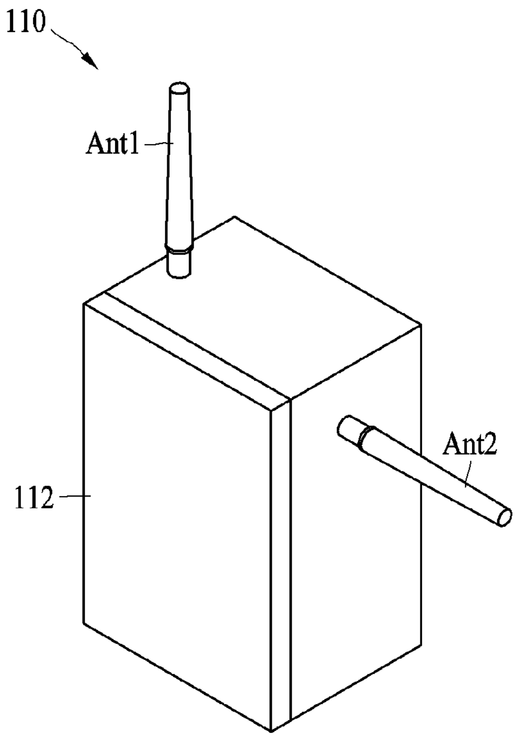
FIG. 1 is a diagram illustrating an example of antenna diversity.

The following structural or functional descriptions of example embodiments described herein are merely intended for the purpose of describing the example embodiments described herein and may be implemented in various forms. Therefore, the example embodiments are not construed as limited to the disclosure and should be understood to include all changes, equivalents, and replacements within the idea and the technical scope of the disclosure. Although terms of “first,” “second,” and the like are used to explain various components, the components are not limited to such terms. These terms are used only to distinguish one component from another component. For example, a first component may be referred to as a second component, or similarly, the second component may be referred to as the first component.

When it is mentioned that one component is “connected” to another component, it may be understood that the one component is directly connected to another component or that still other component is interposed between the two components.

The singular forms are intended to include the plural forms as well, unless the context clearly indicates otherwise. It will be further understood that the terms “comprises” and/or “comprising,” when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. When describing the example embodiments with reference to the accompanying drawings, like reference numerals refer to like components and a repeated description related thereto will be omitted.

Figure 2A:
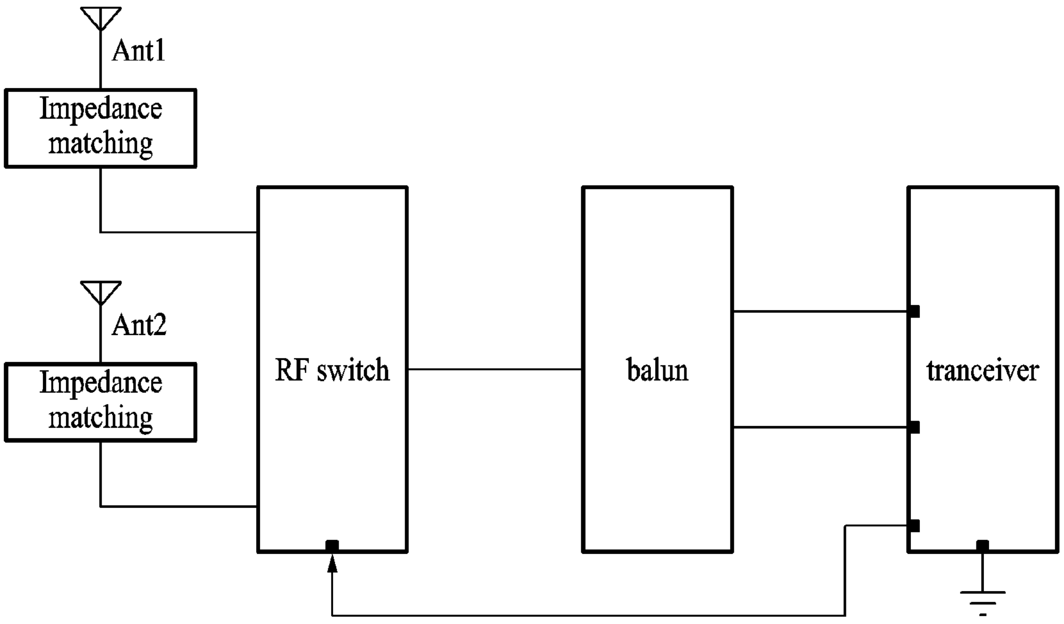
FIG. 2A and FIG. 2B are diagrams illustrating an example of antenna diversity.
Figure 2B:
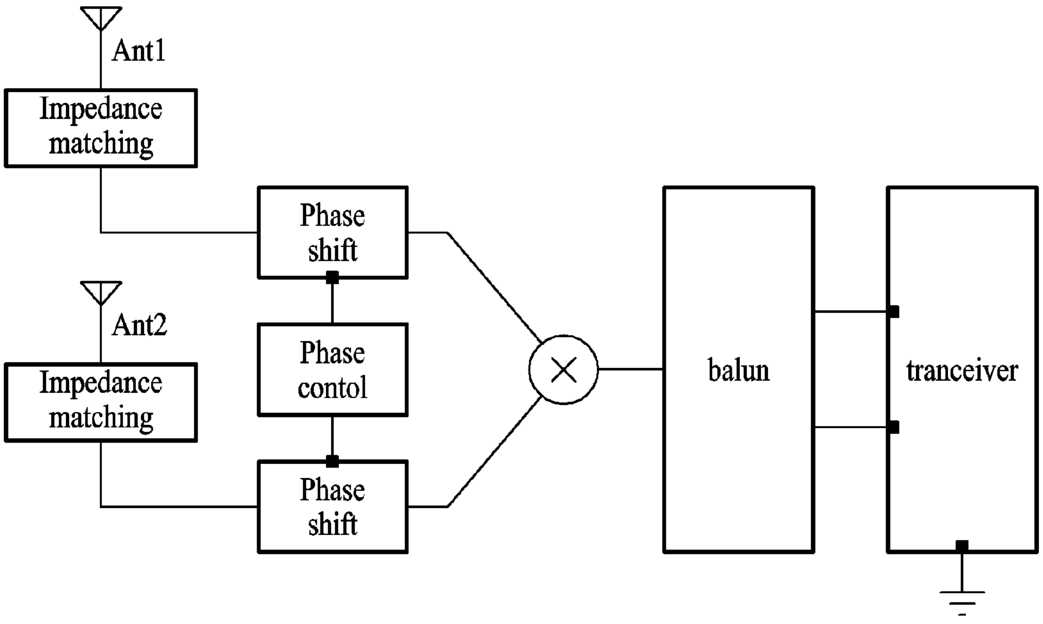

FIGS. 1, 2A, and 2B are diagrams illustrating an example of antenna diversity.

Referring to FIGS. 1 and 2, the antenna diversity means that a plurality of antennas (e.g., a plurality of monopole antennas) Ant1 and Ant2 are used in one electronic device (e.g., a wireless communication device) 110 or 120, in order to increase a transmitting and receiving rate of a wireless signal.

FIG. 1 may illustrate an example in which the plurality of antennas Ant1 and Ant2 are used for antenna diversity. As illustrated in FIG. 1, the plurality of antennas Ant1 and Ant2 may be disposed variously in order to reduce interference therebetween. For example, in the electronic device 110, the plurality of antennas Ant1 and Ant2 may be disposed outside a housing 112 of the electronic device 110 in an orthogonal direction in order to reduce interference therebetween. In another example, in the electronic device 120, the plurality of antennas Ant1 and Ant2 may be disposed outside a housing 122 of the electronic device 120 at a certain interval D therebetween in order to reduce interference therebetween.

FIGS. 2A and 2B are diagrams illustrating an example of a method of transmitting and receiving signals using the plurality of antennas Ant1 and Ant2 for antenna diversity. For example, a method of selecting the antenna Ant 1 or Ant2 having excellent transmitting and receiving characteristics among the plurality of antennas Ant1 and Ant2 through a switch (e.g., a radio frequency (RF) switch) for antenna diversity may be used. In another example, a method of performing phase shift of signals received by the plurality of antennas Ant1 and Ant2 and performing merging may be used.

Figure 3:
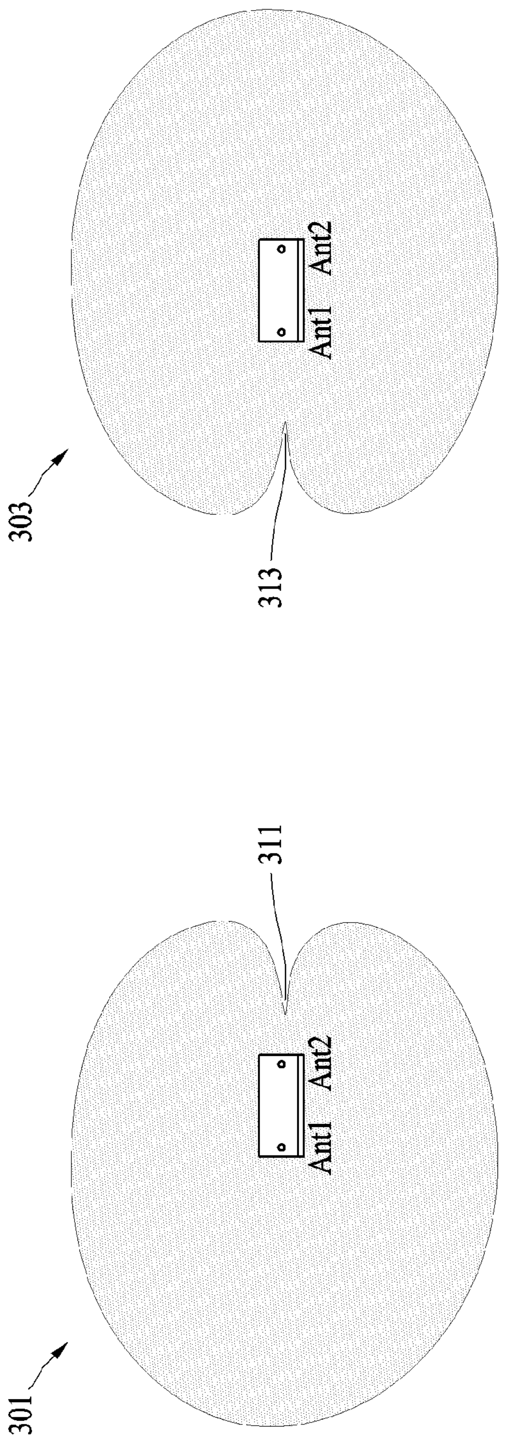
FIG. 3 is a diagram illustrating interference occurring between diversity antennas.

FIG. 3 is a diagram illustrating interference occurring between the plurality of antennas.

Referring to FIG. 3, in a case of transmitting and receiving signals using all the plurality of antennas Ant1 and Ant2, a radiation characteristic 301 or 303 of one antenna Ant1 or Ant2 may be affected (e.g., interfered) by the other antenna Ant2 or Ant1. For example, the antenna Ant1 may have the radiation characteristic 301 containing a null 311 formed by the other antenna Ant2. The antenna Ant2 may also have the radiation characteristic 303 containing a null 313 formed by the other antenna Ant1. The nulls 311 and 313 may respectively disturb the antennas Ant1 and Ant2 from having the omni-directional radiation characteristics.

Figure 4:
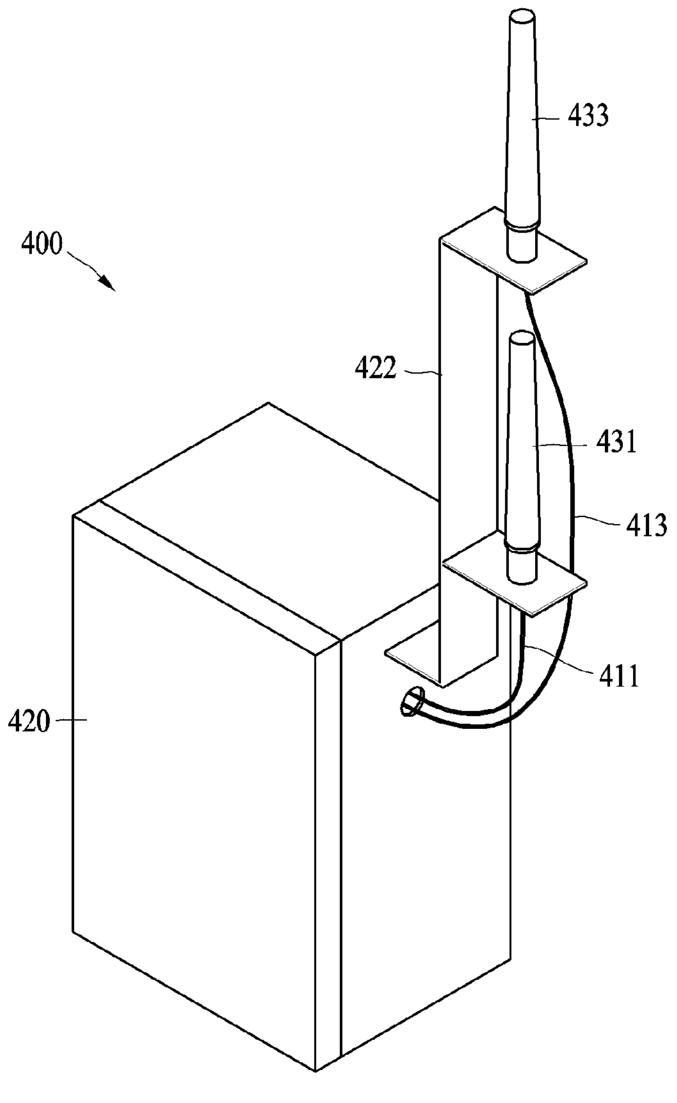
FIG. 4 is a diagram illustrating an example of an electronic device including a plurality of monopole antennas arranged coaxially.

FIG. 4 is a diagram illustrating an example of an electronic device including a plurality of monopole antennas arranged coaxially.

Referring to FIG. 4, an electronic device 400 may include a housing 420, a plurality of antennas 431 and 433, and power supply lines 411 and 413. The plurality of antennas 431 and 433 may be arranged in a vertical direction coaxially, in order to reduce interference between the plurality of antennas 431 and 433. The plurality of antennas 431 and 433 may be disposed outside the housing 420 or disposed on a bracket 422 that is separately attached to the housing 420. The power supply lines 411 and 413 may be respectively connected (e.g., electrically connected) to the plurality of antennas 431 and 433 from a module (e.g., communication module) (not illustrated) that is disposed inside the housing 420. The plurality of antennas Ant1 and Ant2 may avoid interference between the plurality of antennas Ant1 and Ant2 due to the structural feature that the antennas Ant1 and Ant2 are arranged coaxially but may be interfered by the power supply lines 411 and 413.

Figure 5:
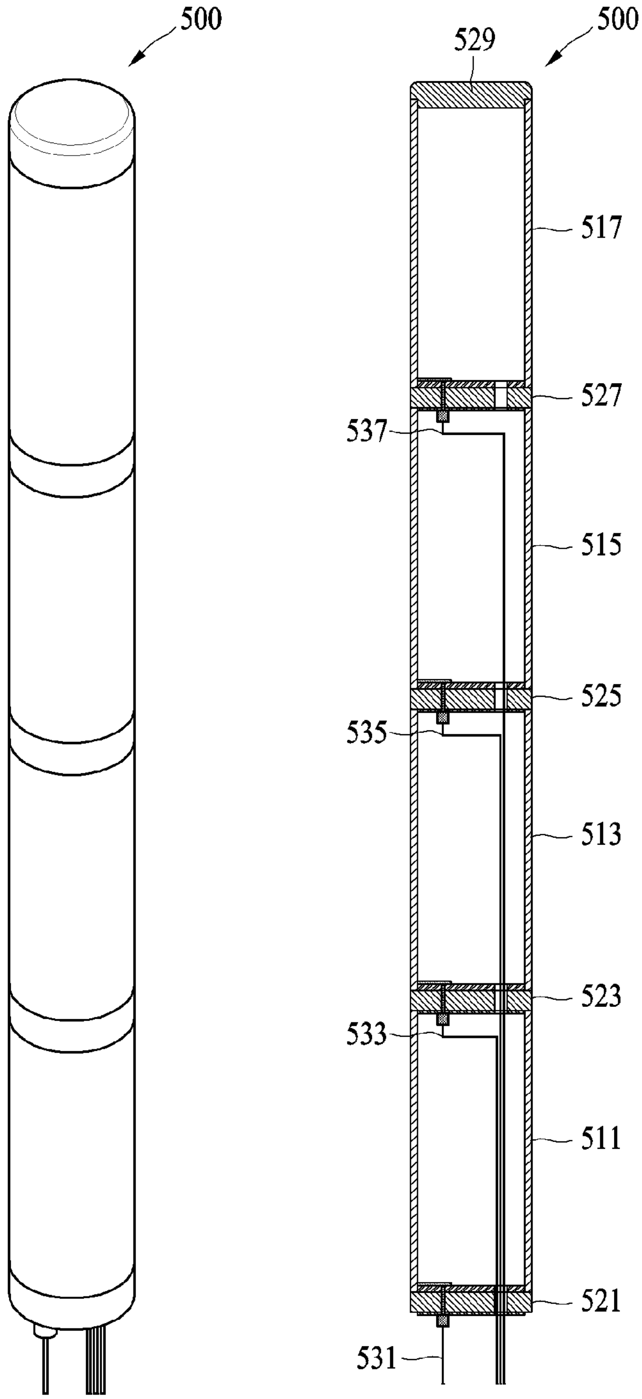
FIG. 5 is a diagram illustrating an example of a diversity antenna according to various example embodiments.
Figure 6B:
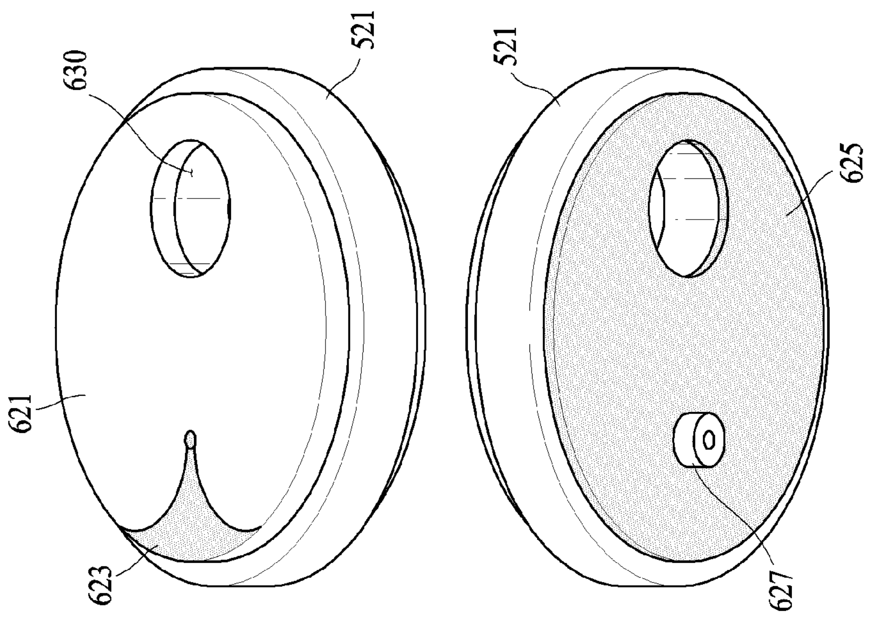
FIG. 6A and FIG. 6B are diagrams illustrating an example of the diversity antenna according to various example embodiments.
Figure 6A:
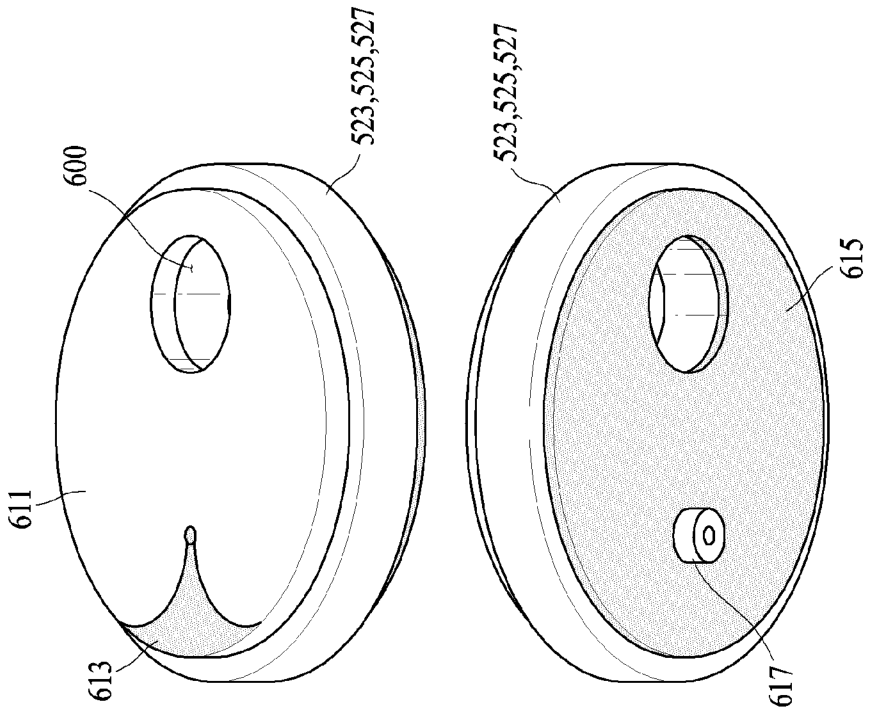

FIGS. 5, 6A and 6B are diagrams illustrating an example of a diversity antenna according to various example embodiments. FIG. 5 is a diagram illustrating an example of a diversity antenna according to various example embodiments, and FIGS. 6A and 6B are detailed views of a connection plate and a lower plate illustrated in FIG. 5.

Referring to FIGS. 5, 6A, and 6B, according to various example embodiments, a diversity antenna 500 may include a plurality of radiation elements 511, 513, 515, and 517, a lower plate 521, one or more connection plates 523, 525, and

527, an upper plate 529, printed circuit boards (PCBs) 611 and 621, connectors 617 and 627, and earth plates 615 and 625. Although four radiation elements 511, 513, 515, and 517 are illustrated in FIG. 5, this is merely an example for illustrating the structure of the diversity antenna 500 and the number of radiation elements is not limited thereto. According to various example embodiments, the plurality of radiation elements 511, 513, 515, and 517 may have a tubular shape (e.g., a cylindrical shape) with apertured upper and lower portions. Each of the plurality of radiation elements 511, 513, 515, and 517 may be arranged in a vertical direction coaxially and transmit and receive a wireless signal.

According to various example embodiments, the plates (e.g., connection plates of a nonmetallic material such as plastic) 521, 523, 525, 527, and 529 may be provided to connect (or couple) the radiation elements 511, 513, 515, and 517 to each other or block the aperture. The lower plate 521 may be coupled to a lower aperture of the radiation element 511 that is disposed on a lowermost end among the plurality of radiation elements 511, 513, 515, and 517. The lower plate 521 may include an aperture 630 for allowing the power supply lines 533, 535, and 537 connected (e.g., electrically connected) to an electronic device (e.g., the electronic device 800 of FIG. 8) to pass through the inside of the diversity antenna 500. The upper plate 529 may be coupled to an upper aperture of the radiation element 517 that is disposed on an uppermost end among the plurality of radiation elements 511, 513, 515, and 517. The connection plates 523, 525, and 527 may be provided to connect the plurality of radiation elements 511, 513, 515, and 517 to each other. The connection plates 523, 525, and 527 may include an aperture 600 for allowing the power supply lines 535 and 537 that are connected to the electronic device (e.g., electronic device 800 of FIG. 8) to pass through.

According to various example embodiments, the PCBs 611 and 621 and the connectors 617 and 627 may be provided to connect (e.g., electrically connect) the power supply lines 531, 533, 535, and 537 to the radiation elements 511, 513, 515, and 517. The PCBs 611 and 621 (e.g., power supply lines 613 and 623 included in the PCBs 611 and 621) may be connected to the connectors 615 and 625. The PCBs 611 and 621 may be disposed on upper surfaces of the plates 521, 523, 525, and 527. The connectors 617 and 627 may be formed to penetrate the plates 521, 523, 525, and 527 and the earth plates 615 and 625.

According to various example embodiments, the power supply lines 531, 533, 535, and 537 that are connected (e.g., electrically connected) to the electronic device (e.g., the electronic device 800 of FIG. 8) may be connected (e.g., electrically connected) to the corresponding radiation elements 511, 513, 515, and 517, respectively, while not interfering with the diversity antenna 500. For example, the power supply line 531 may be connected to the radiation element 511 through the connector 627 and the PCB 621 (e.g., power supply line 623 included in the PCB 621). The power supply line 533 may pass through the lower plate 521 (e.g., the aperture 630 of the lower plate 521) and the radiation element 511 (e.g., the empty space inside the radiation element 511), and may be connected to the radiation element 513 through the connector 617 and the PCB 611 (e.g., the power supply line 613 included in the PCB 611). The power supply line 535 may pass through the lower plate 521 (e.g., the aperture 630 of the lower plate 521), the radiation element 511 (e.g., the empty space inside the radiation element 511), the connection plate 523 (e.g., the aperture 600 of the connection plate 523), and the radiation element 513 (e.g., the empty space inside the radiation element 513), and may be connected to the radiation element 515 through the connector 617 and the PCB 611 (e.g., the power supply line 613 included in the PCB 611). The power supply line 537 may pass through the lower plate 521 (e.g., the aperture 630 of the lower plate 521), the radiation element 511 (e.g., the empty space inside the radiation element 511), the connection plate 523 (e.g., the aperture 600 of the connection plate 523), the radiation element 513 (e.g., the empty space inside the radiation element 513), the connection plate 525 (e.g., the aperture 600 of the connection plate 525), and the radiation element 515 (e.g., the empty space inside the radiation element 515), and may be connected to the radiation element 517 through the connector 617 and the PCB 611 (e.g., the power supply line 613 included in the PCB According to various example embodiments, the earth plates 615 and 625 may be provided for earthing of the diversity antenna 500. The earthing plates 615 and 625 may be respectively formed on lower surfaces of the plates 521, 523, 525, and 527.

According to various example embodiments, the diversity antenna 500 may have the omni-directional radiation characteristic with the structural characteristics described above.

Figure 7:
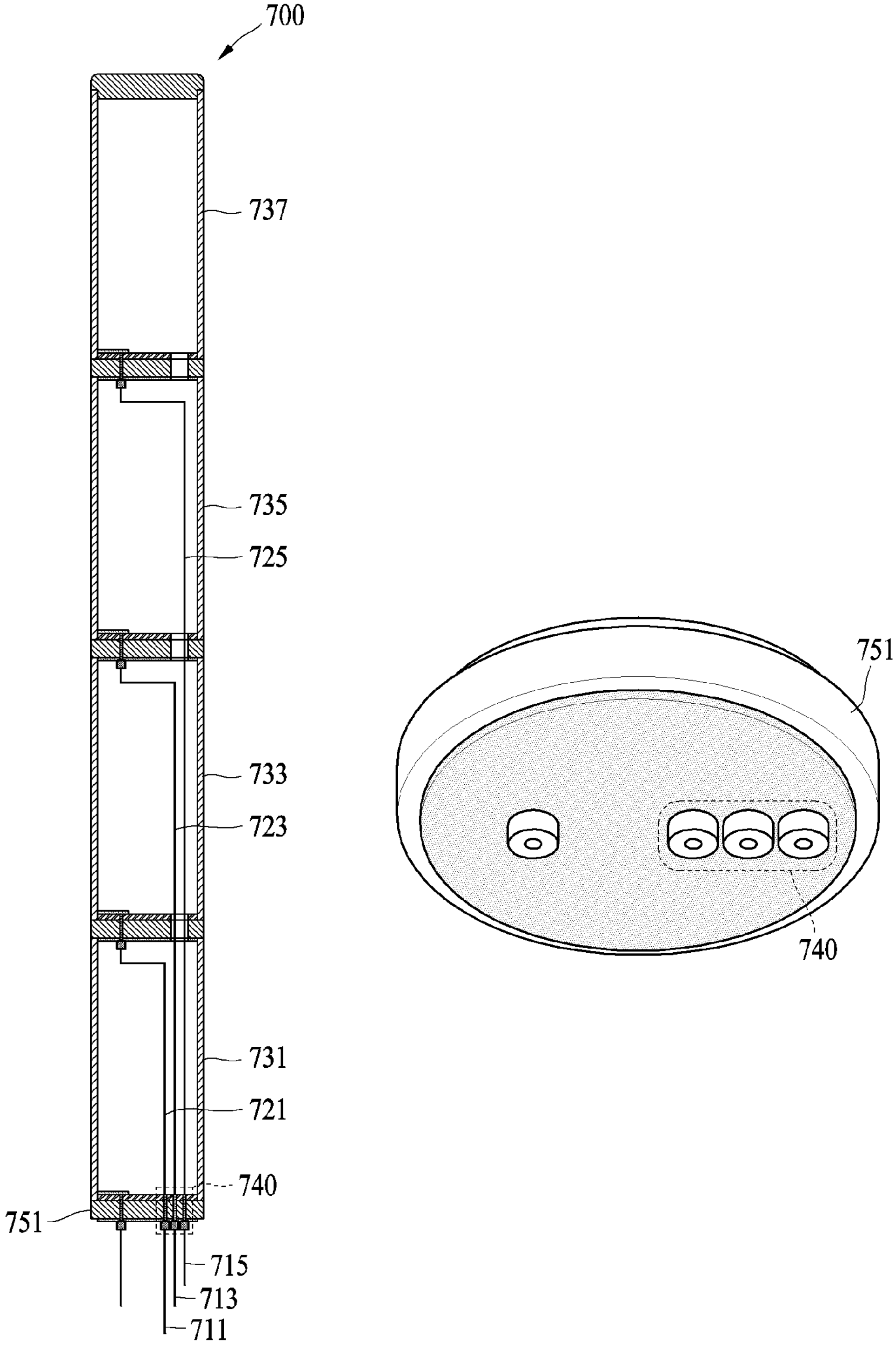
FIG. 7 is a diagram illustrating another example of a diversity antenna according to various example embodiments.

FIG. 7 is a diagram illustrating another example of a diversity antenna according to various example embodiments.

Referring to FIG. 7, according to various example embodiments, a diversity antenna 700 may be substantially the same as the diversity antenna 500 of FIG. 5. However, the diversity antenna 700 may further include power supply lines 721, 723, and 725, while the diversity antenna 500 of FIG. 5 does not include the power supply lines 531, 533, 535, and 537. Hereinafter, the description provided above is not repeated and a difference between the diversity antenna 500 of FIG. 5 and the diversity antenna 700 is described in detail.

According to various example embodiments, the diversity antenna 700 may include the power supply lines 721, 723, and 725 in an inner portion (e.g., empty space inside) of the diversity antenna 700.

According to various example embodiments, the power supply lines 721, 723, and 725 may be respectively connected (e.g., electrically connected) to the power supply lines 711, 713, and 715 that are connected (e.g., electrically connected) to the electronic device (e.g., the electronic device 800 of FIG. 8) through a connector 740 that is disposed on a lower plate 751 (e.g., penetrates the lower plate 751). For example, the power supply line 721 may be connected to the power supply line 711 through the connector 740 (e.g., connector disposed on the left in the connector 740). The power supply line 723 may be connected to the power supply line 713 through the connector 740 (e.g., connector disposed in the middle in the connector 740). The power supply line 725 may be connected to the power supply line 715 through the connector 740 (e.g., connector disposed on the right in the connector 740).

Figure 8:
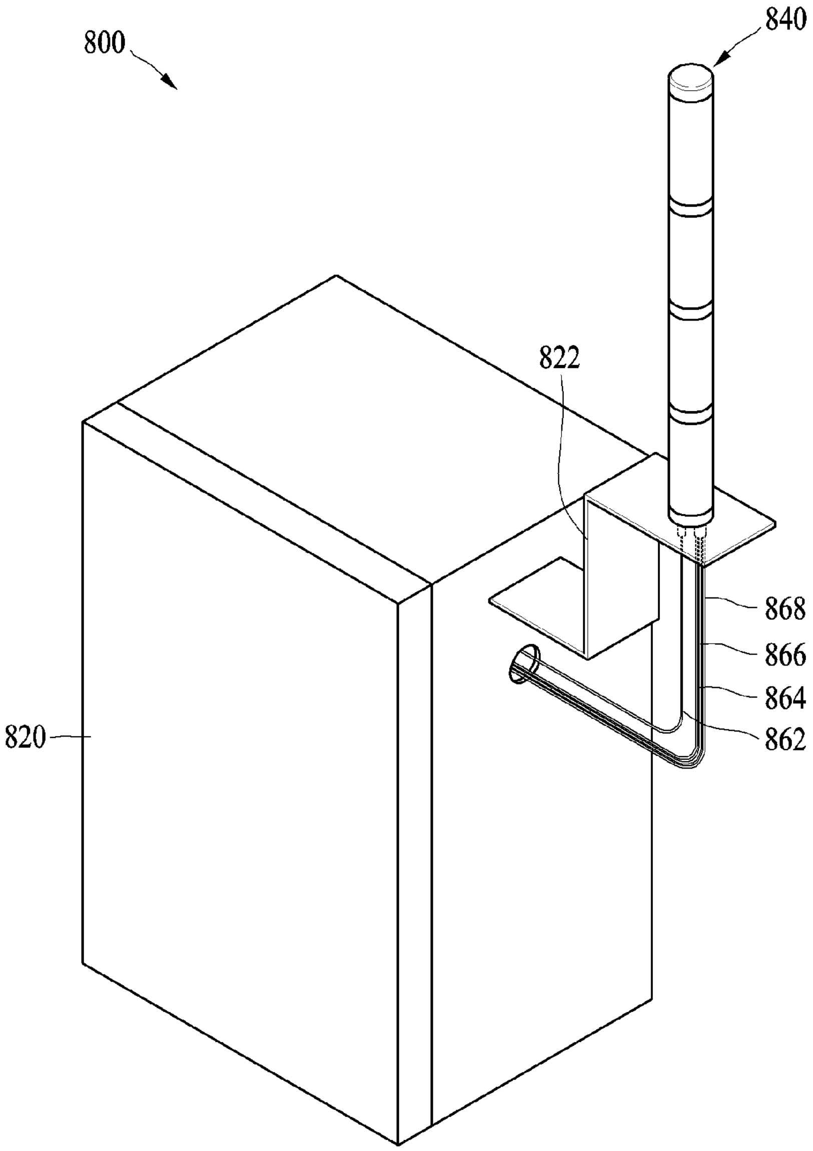
FIG. 8 is a diagram illustrating an example of an electronic device including a coaxially arranged diversity antenna according to various example embodiments.

FIG. 8 is a diagram illustrating an example of an electronic device including a coaxially arranged diversity antenna according to various example embodiments.

Referring to FIG. 8, according to various example embodiments, an electronic device 800 may include a housing 820, a diversity antenna 840, and power supply lines 862, 864, 866, and 868.

According to various example embodiments, the housing 820 may form the appearance of the electronic device 800. The diversity antenna 840 may be substantially the same as the diversity antennas 500 and 700 of FIGS. 5 and 7. The diversity antenna 840 may be disposed outside the housing 820 of the electronic device 800 or disposed at a bracket 822 that is separately attached to the housing 820. The power supply lines 862, 864, 866, and 868 may be connected (e.g., electrically connected) to the diversity antenna 840 from a module (e.g., communication module) (not illustrated) that is disposed inside the housing 820.

According to various example embodiments, in a case of searching for a location of an object by using a radio frequency (RF), the electronic device 800 may set a reference point accurately and increase accuracy, by using the diversity antenna 840 that is arranged coaxially.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The described hardware devices may be configured to act as one or more software modules in order to perform the operations of the above-described example embodiments, or vice versa.

Although the example embodiments have been described with the limited drawings as above, those skilled in the art may apply various technical changes and modifications based on the related art. Suitable results may be achieved if the described techniques are performed in a different order, and/or if components in a described system, architecture, device, or circuit are combined in a different manner and/or replaced or supplemented by other components or their equivalents.

Thus, the scope of the following claims includes other implements, other example embodiments, and equivalents of the claims.

What is claimed is:

1. A diversity antenna comprising:
- a plurality of radiation elements having a tubular shape with apertured upper and lower portions;
- at least one connection plate disposed between the plurality of radiation elements to connect the plurality of radiation elements to each other;
- a printed circuit board (PCB) disposed on an upper surface of the connection plate; and
- a connector configured to connect a power supply line to the PCB,
- wherein the plurality of radiation elements is arranged in a vertical direction coaxially, and
- wherein the connection plate comprises an aperture configured to allow the power supply line to pass through.

2. The diversity antenna of claim 1, wherein the tubular shape includes a cylindrical shape.

3. The diversity antenna of claim 1, wherein the printed circuit board (PCB) is configured to connect the power supply line to the plurality of radiation elements.

4. The diversity antenna of claim 3, further comprising an earth plate for earthing of the diversity antenna,
- wherein the earth plate is disposed on a lower surface of the connection plate.

5. The diversity antenna of claim 4,
- wherein the connector is formed to penetrate the connection plate and the earth plate.

6. The diversity antenna of claim 3, further comprising:
- a lower plate coupled to a lower aperture of a first radiation element that is disposed at a lowermost end among the plurality of radiation elements; and
- an upper plate coupled to an upper aperture of a second radiation element that is disposed at an uppermost end among the plurality of radiation elements,
- wherein the lower plate comprises an aperture configured to allow the power supply line to pass through.

7. A diversity antenna comprising:
- a plurality of radiation elements having a tubular shape with apertured upper and lower portions;
- at least one connection plate disposed between the plurality of radiation elements to connect the plurality of radiation elements to each other;
- a printed circuit board (PCB) disposed on an upper surface of the connection plate; and
- a first connector configured to connect a second power supply line to the PCB,
- wherein the plurality of radiation elements is arranged in a vertical direction coaxially,
- wherein the connection plate comprises an aperture configured to allow the second power supply line to pass through,
- wherein the second power supply line is configured to connect a first power supply line connected to an electronic device to the plurality of radiation elements,
- wherein the second power supply line is disposed inside the plurality of radiation elements.

8. The diversity antenna of claim 7, wherein the PCB is configured to connect the second power supply line to the plurality of radiation elements.

9. The diversity antenna of claim 8, further comprising an earth plate for earthing of the diversity antenna,
- wherein the earth plate is disposed on a lower surface of the connection plate.

10. The diversity antenna of claim 9,
- wherein the first connector is formed to penetrate the connection plate and the earth plate.

11. The diversity antenna of claim 10, further comprising:
- a lower plate coupled to a lower aperture of a first radiation element that is disposed at a lowermost end among the plurality of radiation elements;
- an upper plate coupled to an upper aperture of a second radiation element that is disposed at an uppermost end among the plurality of radiation elements; and
- a second connector configured to connect the first power supply line to the second power supply line,
- wherein the second connector is formed to penetrate the lower plate.

12. An electronic device comprising:
- a housing; and
- a diversity antenna that is disposed outside the housing,
- wherein the diversity antenna comprises:
  - a plurality of radiation elements having a tubular shape with apertured upper and lower portions;
  - at least one connection plate disposed between the plurality of radiation elements to connect the plurality of radiation elements to each other;
  - a printed circuit board (PCB) disposed on an upper surface of the connection plate; and
  - a connector configured to connect a power supply line to the PCB,
- wherein the plurality of radiation elements is arranged in a vertical direction coaxially, and wherein the connection plate comprises an aperture configured to allow the power supply line to pass through.

* * * * *